United States Patent
Kiryakov et al.

(10) Patent No.: US 12,008,020 B2
(45) Date of Patent: Jun. 11, 2024

(54) LOOKUP AND RELATIONSHIP CACHES FOR DYNAMIC FETCHING

(71) Applicant: MicroStrategy Incorporated, Tysons Corner, VA (US)

(72) Inventors: Yuliyan Kiryakov, McLean, VA (US); Bingbing Ji, Centreville, VA (US); Ananya Ojha, Dunn Loring, VA (US)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 79 days.

(21) Appl. No.: 17/384,857

(22) Filed: Jul. 26, 2021

(65) Prior Publication Data

US 2023/0023134 A1 Jan. 26, 2023

(51) Int. Cl.
| | | |
|---|---|---|
| *G06F 16/28* | (2019.01) | |
| *G06F 16/22* | (2019.01) | |
| *G06F 16/2455* | (2019.01) | |
| *G06F 16/25* | (2019.01) | |
| *G06N 5/04* | (2023.01) | |
| *G06N 20/00* | (2019.01) | |

(52) U.S. Cl.
CPC ........ *G06F 16/283* (2019.01); *G06F 16/2264* (2019.01); *G06F 16/24552* (2019.01); *G06F 16/254* (2019.01); *G06N 5/04* (2013.01); *G06N 20/00* (2019.01)

(58) Field of Classification Search
CPC ............. G06F 16/283; G06F 16/24552; G06F 16/2264; G06F 16/254; G06N 20/00; G06N 5/04
See application file for complete search history.

(56) References Cited

U.S. PATENT DOCUMENTS

| | | | | |
|---|---|---|---|---|
| 9,501,585 | B1* | 11/2016 | Gautam | G06F 16/3328 |
| 2006/0143071 | A1* | 6/2006 | Hofmann | G06Q 30/02 |
| | | | | 705/7.34 |
| 2010/0250566 | A1* | 9/2010 | Paul | G06F 16/283 |
| | | | | 707/756 |
| 2013/0339291 | A1* | 12/2013 | Hasner | G06F 16/283 |
| | | | | 707/601 |
| 2014/0372346 | A1* | 12/2014 | Phillipps | G06N 20/00 |
| | | | | 706/12 |

* cited by examiner

*Primary Examiner* — Mariela Reyes
*Assistant Examiner* — Courtney Harmon
(74) *Attorney, Agent, or Firm* — Bookoff McAndrews, PLLC

(57) ABSTRACT

Disclosed are methods, systems, and computer-readable medium for providing report results. Viscous attributes and non-viscous may be identified. A smart cube may be received and may include viscous values for the viscous attributes. The smart cube may be stored at a local cache. A report associated with an organization may be initiated. A runtime generation of the report may be generated based on initiating the report. The report may call a viscous attribute from the viscous attributes and call a non-viscous attribute from the non-viscous attributes. The runtime generation may be modified to remove the viscous attribute from the runtime generation. A viscous value for the viscous attribute may be retrieved from the smart cube at the local cache. The modified runtime generation may be executed to retrieve a non-viscous value for the non-viscous attribute from a remote database and a report result may be provided.

20 Claims, 12 Drawing Sheets

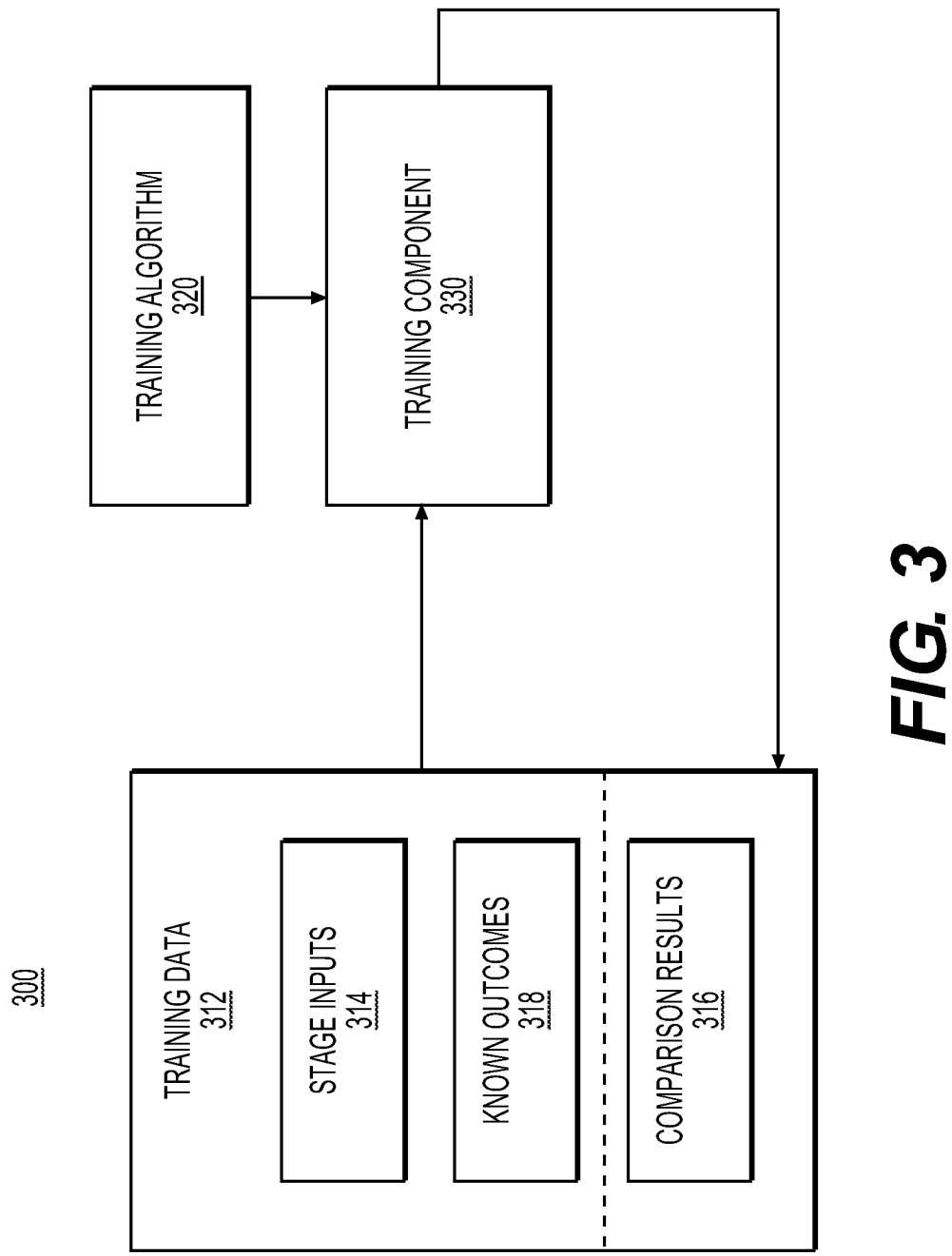

| CUSTOMER ID | CUSTOMER LAST NAME | CUSTOMER FIRST NAME | CUSTOMER ADDRESS |
|---|---|---|---|
| 7796 | AABY | ALEN | 864 KALISPELL DR |
| 1874 | AADLAND | MIKO | 415 VIRGINIA AVE |
| 3771 | AADLAND | WARNER | 725 OLD HIGHWAY 49 S |
| 4432 | AADLAND | CONSTANT | 4205 DERBY RD |
| 7923 | AAFEDT | WENDY | 15504 OLIVE BRANCH DR |
| 1930 | AAGESEN | BINK | 82 HALLBAR RD |
| 3345 | AALGAARD | KENNEY | 1019 NW 25TH AVE |
| 7632 | AAMODT | STACY | A1 MAPLEWOOD PK |
| 2306 | AARESTAD | BENJAMINE | 935 33RD AVE SW |
| 7570 | AARNINK | MARLAN | 2509 CAPTAINS CT |
| 7455 | AARON | FERRELL | 6481 W 11TH CT |
| 1 | AARONSON | MAXWELL | 9865 MARION PLACE APT. |
| 4459 | AASEN | BEATRICE | 242 E WATER ST |
| 4593 | ABA | BLAIN | 1659 SOUTH BLVD |
| 1210 | ABA-BULGU | LESLIE | 1402 S DESERT VISTA DR |
| 1866 | ABAD | GEOFFREY | 23248 CALVERT ST |
| 3888 | ABAD | BEKIR | 677 EDGEMERE AVE |
| 1167 | ABADILLA | JENNIE | 104 WOODSIDE GRN |

EXECUTION COMPLETE

```
 10    SUM OF QUERY EXECUTION TIME:           0:00:00.00
 11    TOTAL DATA FETCHING AND PROCESSING TIME:     0:00:20.95
 12        TOTAL DATA TRANSFER FROM DATASOURCE (S) TIME:  0:00:18.16
 13    TOTAL ANALYTICAL PROCESSING TIME:      0:00:00.00
 14    TOTAL OTHER PROCESSING TIME:    0:00:01.31
 15
 16    SUM OF TEMPLATE CALCULATE TIME:        0:00:00.00
 17    SUM OF AE DATA PERSISTING TIME:   0:00:00.21
 18    TOTAL CUBE PUBLISH TIME:    0:00:23.79
 19
 20
 21    NUMBER OF ROWS RETURNED:       838787
 22    NUMBER OF COLUMNS RETURNED:    23
 23
 24    NUMBER OF TEMP TABLES:     0        ~624
 25
 26    TOTAL NUMBER OF PASSES:    2
 27    NUMBER OF DATASOURCE QUERY PASSES:     2
 28    NUMBER OF ANALYTICAL QUERY PASSES:     0
 29
 30    DB USER:       T177MQWH
 31    DB INSTANCE:       T177MQWH
 32
 33    TABLES ACCESSED:
 34    LU_DAY
 35    LU_CATEGORY
 36    LU_CUSTOMER
 37    LU_ITEM         -622
 38    LU_MONTH
 39    LU_QUARTER
 40
 41    LU_SUBCATEG
 42    ORDER_DETAIL
 43
 44
 45
 46    SQL STATEMENTS:
 47
 48    PASS0 -    QUERY PASS START TIME:   5/15/2020  7:50:43 PM
 49        QUERY PASS END TIME:   5/15/2020  7:51:05 PM
 50        QUERY EXECUTION:   0:00:00.00
 51        DATA FETCHING AND PROCESSING:   0:00:20.95
 52        DATA TRANSFER FROM DATASOURCE (S)  0:00:18.16
 53        OTHER PROCESSING:   0:00:01.31
 54        ROWS SELECTED: 838787
```

NORMAL TEXT FILE

*FIG. 6B*

← FROM FIG. 6B  630

```
10  SUM OF QUERY EXECUTION TIME:              0:00:00.00
11  TOTAL DATA FETCHING AND PROCESSING TIME:  0:00:06.66
12    TOTAL DATA TRANSFER FROM DATASOURCE (S) TIME:  0:00:05.43
13  TOTAL ANALYTICAL PROCESSING TIME:         0:00:00.00
14  TOTAL OTHER PROCESSING TIME:              0:00:00.42
15
16  SUM OF TEMPLATE CALCULATE TIME:           0:00:00.00
17  SUM OF AE DATA PERSISTING TIME:           0:00:00.22
18  TOTAL CUBE PUBLISH TIME:                  0:00:08.10
19
                                        634
20
21  NUMBER OF ROWS RETURNED:                  838787
22  NUMBER OF COLUMNS RETURNED:               12
23  NUMBER OF DATABASE COLUMNS DYYNAMICALLY SOURCED:  11
24  NUMBER OF TEMP TABLES:                    0
25
26  TOTAL NUMBER OF PASSES:                   2
27  NUMBER OF DATASOURCE QUERY PASSES:        2
28  NUMBER OF ANALYTICAL QUERY PASSES:        0
29
30  DB USER:        T177MQWH
31  DB INSTANCE:    T177MQWH
32  TABLES ACCESSED:
33  LU_DAY
34
35
36  LU_CUSTOMER
37  LU_ITEM                  632
38
39
40
41  LU_SUBCATEG
42  ORDER_DETAIL
43  THIS OBJECT DYNAMICALLY SOURCES ATTRIBUTE BASE FORM(S) FROM THE FOLLOWING INTELLIGENT CUBE(S)
44  [ATTRIBUTE FORM CACHE CUBE]
45
46  SQL STATEMENTS:
47
48  PASS0 -     QUERY PASS START TIME:    5/15/2020  7:51:50 PM
49              QUERY PASS END TIME:      5/15/2020  7:51:57 PM
50              QUERY EXECUTION:    0:00:00.00
51              DATA FETCHING AND PROCESSING:  0:00:06.66
52                DATA TRANSFER FROM DATASOURCE (S):  0:00:05.43
53              OTHER PROCESSING:   0:00:00.10
54              ROWS SELECTED: 838787
```

LENGTH: 2,931   LINES: 125   LN: 23   COL: 55   SEL: 010        WINDOWS (CR LF)   UTF-8   INS

FIG. 6B(CONT.)

LOOKUP AND RELATIONSHIP CACHES FOR DYNAMIC FETCHING

TECHNICAL FIELD

Various embodiments of the present disclosure relate generally to methods and systems for data retrieval and storage management and, more particularly, to methods and systems for utilizing lookup and relationship caches to build smart cubes for dynamic data retrieval.

BACKGROUND

Organizations are generating and utilizing ever greater amounts of data. This data is processed and used in making decisions in business, government, and other settings. In many cases, large datasets are often exchanged with static information and significant operations may be needed to prepare datasets for use. For instance, processing of an online analytical processing (OLAP) cube may include the following: a client splits a cube into several tables comprising a large dataset; the client sends each table in sequence to a server executing a program to process the table in sequence; the client sends a script for each table to the server; the server applies the script to process the table; and the server sends back the processed table to the client. Such a process is inefficient as it can consume a large amount of time to join static tables especially when the large dataset is being transmitted repeatedly.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and computer-readable medium are disclosed for decreasing report result times. For instance, a method may include: identifying viscous attributes, the viscous attributes being a subset of a plurality of item attributes comprising the viscous attributes and non-viscous attributes, the viscous attributes and the non-viscous attributes being associated with an organization; receiving, at a first time, a first smart cube comprising viscous values for at least a first subset of the viscous attributes; storing the first smart cube at a local cache. Initiating a report associated with the organization; generating a runtime generation of the report based on initiating the report; determining that the report calls a first viscous attribute from the viscous attributes and calls a first non-viscous attribute from the non-viscous attributes; modifying the runtime generation to remove the first viscous attribute from the runtime generation; retrieving a first viscous value for the first viscous attribute from the first smart cube at the local cache; executing the modified runtime generation to retrieve a first non-viscous value for the first non-viscous attribute from a remote database; and providing a report result.

Furthermore, a system may include at least one memory storing instructions; and at least one processor executing the instructions to perform operations. The operations may include: identifying viscous attributes, the viscous attributes being a subset of a plurality of item attributes comprising the viscous attributes and non-viscous attributes, the viscous attributes and the non-viscous attributes being associated with an organization; receiving, at a first time, a first smart cube comprising viscous values for at least a first subset of the viscous attributes. Storing the first smart cube at a local cache; initiating a report associated with the organization; generating a runtime generation of the report based on initiating the report; determining that the report calls a first viscous attribute from the viscous attributes and calls a first non-viscous attribute from the non-viscous attributes; modifying the runtime generation to remove the first viscous attribute from the runtime generation; retrieving a first viscous value for the first viscous attribute from the first smart cube at the local cache; executing the modified runtime generation to retrieve a first non-viscous value for the first non-viscous attribute from a remote database and providing a report result.

Moreover, a non-transitory computer-readable medium may store instructions that, when executed by a processor, cause the processor to perform operations. The operations may include: identifying viscous attributes, the viscous attributes being a subset of a plurality of item attributes comprising the viscous attributes and non-viscous attributes, the viscous attributes and the non-viscous attributes being associated with an organization; receiving, at a first time, a first smart cube comprising viscous values for at least a first subset of the viscous attributes; storing the first smart cube at a local cache; initiating a report associated with the organization; generating a runtime generation of the report based on initiating the report; determining that the report calls a first viscous attribute from the viscous attributes and calls a first non-viscous attribute from the non-viscous attributes; modifying the runtime generation to remove the first viscous attribute from the runtime generation; retrieving a first viscous value for the first viscous attribute from the first smart cube at the local cache; executing the modified runtime generation to retrieve a first non-viscous value for the first non-viscous attribute from a remote database and providing a report result.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a data flow for training a machine learning model, according to one or more embodiments.

FIG. 6B depicts an example code comparison for dynamic fetching, according to one or more embodiments.

DETAILED DESCRIPTION OF EMBODIMENTS

Figure 1:
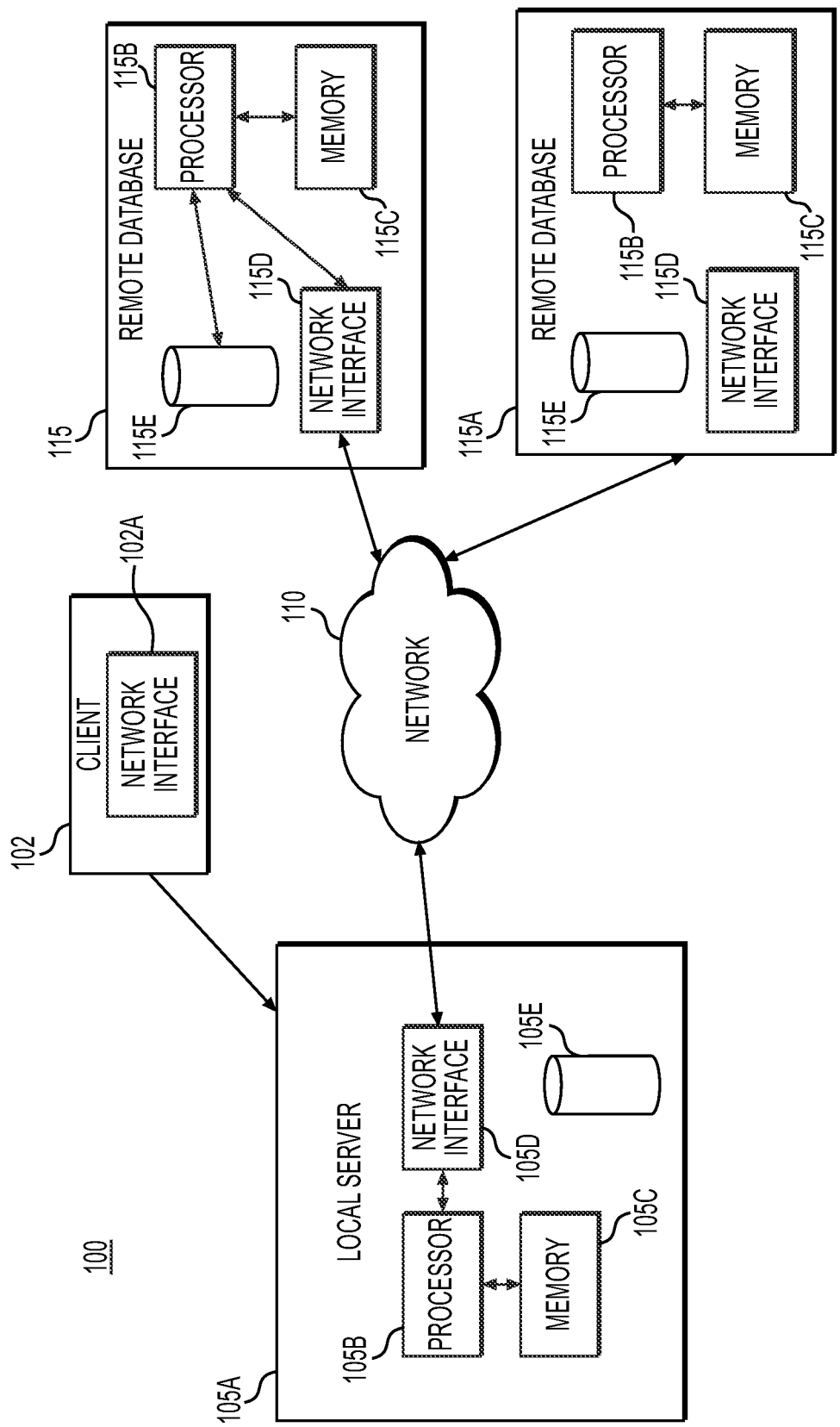
FIG. 1 depicts an exemplary block diagram of a system for dynamic fetching, according to one or more embodiments.

Various embodiments of the present disclosure relate generally to methods and systems for dynamic data fetching.

In general, the present disclosure is directed to increasing the speed and/or efficiency of report outcomes by using dynamic fetching of item attributes. The techniques provided herein provide for faster processing of data by, for example, using a dynamic fetching process that updates runtime generation of reports to receive data from both a local cache and one or more remote databases. The techniques provide for optimizing the use of the local cache to reduce the joining of tables at a remote database and/or to reduce transmission of viscous data over a network.

While this disclosure describes the systems and methods with reference to dynamic fetching using smart cubes, it should be appreciated that the present systems and methods may be applicable to dynamic fetching of multi-dimensional datasets in general.

As applied herein, an item attribute may be any attribute that is calculated, stored, analyzed, or applied by a system. An item attribute may be associated with a given organization. An overall set of item attributes associated with an organization may provide a holistic view of the identifiable operations of the organization. Non-limiting examples of item attributes include age range, brand, catalog, category, credit risk, customer, customer address, customer age, customer country, customer email, date, days to ship, discontinued codes, education level, employee age, employee experience, first order date, last order date, order average, household count, income bracket, inventory, item, lifetime value score, marital status, month, month of year, order, payment method, phone plan, phone usage, promotion type, quarter, rush order status, salary, sales, revenue, ship date, shipper, status, store city, store country, store state, store zip code, subcategory, supply chain metrics, supplier, warranty, and year. Item attributes may be recorded, calculated, and/or updated at one or more warehouse databases that may be remote databases. Each item attribute may have a value (e.g., a number, a string, a relationship, etc.) associated with it. An aggregator may receive different item attributes and/or item attribute values from various sources (e.g., remote databases) and may aggregate the item attributes and/or their values to be provided to a local server for report generation (e.g., by joining tables).

As applied herein, a viscous attribute may be an item attribute that does not change over time relative to one or more non-viscous attributes. The frequency of change of a viscous attribute may be pre-determined or may be dynamically determined, as further disclosed herein. An example of a viscous attribute is a store address. In this example, a store address does not change nearly as much as, for example, sales data for the store associated with the store address. Accordingly, the store address can be considered a viscous attribute and the sales data can be considered a non-viscous attribute. Viscous attributes may have values that repeat frequently (i.e., that do not change as frequently as non-viscous attributes).

As applied herein, a local cache may be a cache that is local to a server that generates report results. The local cache may be accessed by the server faster than a remote database. Data stored in the local cache may be accessible to the server directly or over a network.

As applied herein, a smart cube may be a multi-dimensional cube that, for example, enables use of OLAP and/or business intelligence (BI) services features. The smart cube may share sets of data among multiple reports to reduce repeat queries for the same or similar information.

A smart cube may manage a set of data that can be shared as a single in-memory copy. According to an implementation, a smart cube may contain tags (e.g., names) associated with data to be used by a server. According to an implementation, one or more APIs may be used to provide a smart cube to a server for caching, to receive viscous attributes from a database to be stored in a smart cube, and/or to provide cached viscous attributes in a smart cube to a server.

According to implementations of the disclosed subject matter, viscous attributes that are a subset of the overall item attributes for a given organization may be identified. The viscous attributes may be identified based on an input or by using a machine learning model configured to distinguish between viscous and non-viscous attributes. A local cache may be populated with a smart cube comprising the viscous attributes and corresponding values, such that a local server can access the viscous attributes and corresponding values stored in the local cache without receiving the same from a remote database.

A client may request one or more reports related to the client organization's operations. The reports may be based on one or more item attributes and may provide an insight into the client's operation. More specifically, the reports may be based on both viscous attributes and non-viscous attributes. Accordingly, a report associated with the organization may be initiated and a runtime generation of the report may be generated. A determination may be made that the report calls one or more viscous attributes and one or more non-viscous attributes. Based on the determination, the runtime generation may be modified to remove the viscous attributes called by the report and the runtime generation may be implemented to retrieve the non-viscous attributes from one or more remote database. The retrieval of the non-viscous attributes may include a) joining the non-viscous attributes in a lookup or relationship table at a remote database and b) transmitting the lookup or relationship tables including the non-viscous attributes and corresponding values from one or more remote databases to the local server. The viscous attributes may be provided locally from the smart cube stored in the local cache. It will be understood that the retrieval of the viscous attributes and corresponding values is relatively quicker than retrieval of the non-viscous attributes and corresponding values. The report results based on both the viscous attributes and non-viscous attributes may be provided to the client associated with the report.

The embodiments disclosed herein provide performance improvement by decreasing the amount of bandwidth, resources, and time that is required in generating report results. By identifying viscous attributes, caching the viscous attributes in a local cache, and modifying runtime generation of reports to exclude the viscous attributes, less tables are joined at a remote database (e.g., the retrieval of item attributes, related codes/identifiers, and corresponding values), less data is transmitted over a network (e.g., from a remote database to a local server), and less time is expended in generating a report result (e.g., based on the reduction in tables being joined and the reduction in data being transmitted across a network).

FIG. 1 depicts an exemplary block diagram of a system for dynamic fetching, according to one or more embodiments. A system 100 may include at least one client 102 with network interface 102A, a local server 105A, a network 110, and/or remote databases 115 and 115A. Although two remote databases 115 and 115A are shown, it will be understood that one or more remote databases may be provided in system 100. While remote databases 115 and 115A may interact with local server 105A, one of skill in the art would recognize that remote databases 115 and 115A may also interact with one or more other local servers. Generally, while the functionality carried out by remote databases 115 and 115A and/or local server 105A are discussed herein separately, in practice these features may be executed on more or fewer. The client 102 may be in communication with local server 105A. Client 102 may be configured to request report results from and/or provide reports to run to local server 105A. Remote databases 115 and 115A may be associated exclusively with client 102 or may be associated with multiple clients.

Local server 105A, and remote databases 115 and 115A may be connected via network 110, using one or more standard communication protocols. Client 102 may be connected to local server 105A via directly, via a network connection that is the same as network 110 or via a different connection. Network 110 may be one or a combination of a wide area network (e.g., the internet), a local network, or other network. Client 102, local server 105A, and remote databases 115 and 115A may transmit and receive data, instructions, and/or other communications from each other across network 110 or one or more other connections (e.g., a connection between client 102 and local server 105A).

Local server 105A may include a processor 105B, a memory 105C, a network interface 105D, and/or a local cache 105E. Local server 105A may be a cloud server, a computer, a cell phone, a tablet, etc. Local server 105A may execute, by processor 105B, an operating system (O/S) and at least one application (each stored in memory 105C). The application may be desktop program, a browser program, or a mobile application program (which may also be a browser program in a mobile O/S). The application may manage local cache 105E, as discussed below, to store viscous attributes (e.g., as smart lookup or relationship cubes) and/or retrieve the stored viscous attributes for report execution. Network interface 105D may be a TCP/IP network interface for, e.g., Ethernet or wireless communications with network 110. Processor 105B, while executing an application, may (1) receive automated or manual inputs to initiate communication with remote databases 115 and 115A, and/or (2) perform operations in accordance with techniques described herein.

The application, executed by processor 105B of local server 105A, may process received viscous items into a database table and/or a smart cube, such as for an analytics platform. A smart cube (e.g., an OLAP cube) may be a multi-dimensional array of data including related tables. For example, local server 105A may receive imported data from any of various sources, such as spreadsheets, comma-separated value (CSV) files, customer relationship management (CRM) systems, office productivity software, cloud computing platforms, and so on. These various sources may correspond to remote databases 115 and 115A and/or other sources. The imported data may be structured or unstructured data. Local server 105A may then process the imported data to publish a functional, queryable smart cube and/or re-publish (e.g., update) an existing smart cube, and/or table(s), using the imported data. The published or republished table(s) and/or smart cube(s) may be stored in local cache 105E. The imported data may be stored in local cache 105E until the publishing process is complete. As disclosed herein, local cache 105E may store viscous attributes while sources such as remote databases 115 and 115A may provide non-viscous attributes. Viscous attributes stored in local cache 105E may be removed (e.g., deleted) from local cache 105E if determined to be non-viscous based on techniques disclosed herein. Although operations on smart cubes or portions thereof are discussed herein, these operations may be performed on a database table or collection of tables.

Remote databases 115 and 115A may each include a processor 115б, a memory 115C, a network interface 115D, and/or a table generation unit 115E. Remote databases 115 and 115A may be a computer, system of computers (e.g., rack server(s)), and/or or a cloud service computer system. Remote databases 115 and 115A may execute, by processor 115B, an operating system (O/S) and one or more instances to provide viscous and/or non-viscous smart tables (each collected at remote databases 115 and/or 115A and stored in memory 115C). Remote databases 115 and 115A may store data in or have access to table generation unit 115E (e.g., hosted on a third party server or in memory 115C). Network interface 115D may be a TCP/IP network interface for, e.g., Ethernet or wireless communications with network 110.

Figure 2A:
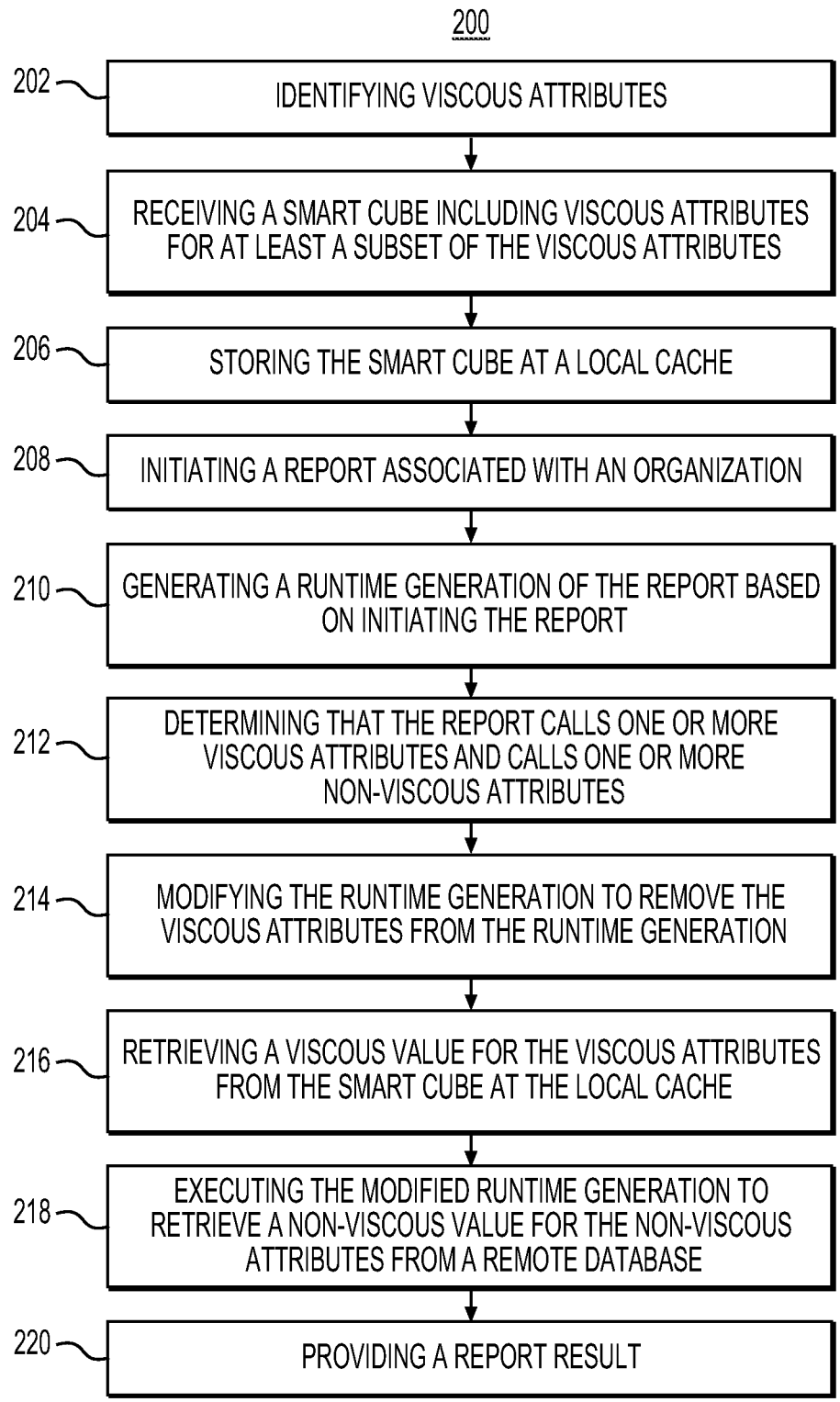
FIG. 2A depicts a flowchart for providing a report result through dynamic fetching, according to one or more embodiments.

FIG. 2A depicts a flowchart 200 for providing a report result through dynamic fetching. At 202 of flowchart 200, viscous attributes may be identified. The viscous attributes may be a subset of a plurality of item attributes that include both the viscous attributes and non-viscous attributes. The viscous attributes and the non-viscous attributes may be associated with a given organization (e.g., a company, a team, a group, an individual, etc.). As non-limiting examples, an organization may be a widget sales company with multiple stores in different parts of the world. Two viscous attributes for the widget sales company may be store names and store locations. Two non-viscous attributes for the widget sales company may be store daily sales and store inventory.

According to an implementation, the viscous attributes may be identified by local server 105A and/or remote database 115 and 115A of FIG. 1. The viscous attributes may be based on determining a frequency of change of item attributes and selecting the item attributes that change below a threshold frequency of change. The threshold frequency of change may be pre-determined or may be output by a machine learning model trained to identify an optimal threshold based on inputs such as average frequency of change of all item attributes, data associated with a given item attribute, historical thresholds, etc. Alternatively, the viscous attributes may be based on user input.

According to an implementation, the viscous attributes may be identified by a machine learning model based on item attributes and past report data. Past report data may include information about previously executed reports for a given organization. The past report data may include information about the change in values for a plurality of item attributes. The past report data may include or the machine learning model may determine the impact the amount of change in values for each given item attribute had on the reports generated based on the item attribute. For example, the past report data may include information about the change in the amount of inventory of a yellow widget in a given store (e.g., between 400 and 450 yellow widgets). The past report data may also include or the machine learning model may determine the impact of a change in the amount of inventory of a yellow widget in the given store on the previously run reports. In this example, the store may sell between 10 and 15 unites of the yellow widget per day. Accordingly, the impact of the inventory of the yellow widget being between 400 and 450 may be minimal on a day to day basis.

The machine learning model may apply the item attributes, their corresponding values, and the past report data to output the viscous attributes that are a subset of the item attributes. The viscous attributes may be the attributes that either do not change frequently in comparison to the overall set of item attributes, that do not change frequently in comparison to a threshold (e.g., an average change value), that change minimally such that the change does not impact the reports for a given organization, or the like.

The machine learning model may also output a viscosity duration for the viscous attributes or a subset of the viscous attributes. In the example above, the viscosity duration for the inventory of yellow widget may be 1 week as a day to day reporting of the inventory of the yellow widget may not materially change the reports that rely on the inventory of the yellow widget. As further discussed herein, a frequency of updating a viscous attribute may be determined based on the viscosity duration. For example, the inventory of the yellow widget may be updated once a week in view of its viscosity duration. A different viscous attribute may have a different viscosity duration (e.g., three days).

At 204 of FIG. 2A, a smart cube including the viscous attributes identified at 202 may be received at local server 105A. The smart cube may be provided by one or multiple remote databases 115 and 115A. If the smart cube is provided by multiple databases, then the smart cube may be assembled at one of the multiple basis, may be assembled in a component of network 110, or may be assembled at local server 105A. The smart cube may be one or both of a lookup cube or a relationship cube. A lookup cube may include attributes and attribute values (e.g., store ID, store name, store location) whereas a relationship table may include relationships (e.g., hierarchy of country, state, city).

At 204 of FIG. 2A, the smart cube including the viscous attributes may be received at local server 105A based on an instruction from client 102 to generate and/or transmit the smart cube. The smart cube may be generated at the one or multiple remote databases 115 and 115A by joining identifiers and values (e.g., store ID and store location) and/or by joining relationships. The smart cube may be transmitted over network 110.

At 206 of FIG. 2A, the smart cube including its content may be stored in local cache 105E associated with local server 105A. According to an implementation, processor 105B may instruct the smart cube received via the network interface 105D to be stored in local cache 105E directly or via memory 105C. The smart cube may be stored in local cache 105E such that it and/or its contents are quickly accessible by local server 105A when compared to local server 105A receiving content from remote databases 115 and 115A.

At 208 of FIG. 2A, a report associated with client 102 (e.g., an organization) may be initiated. The report may be initiated by client 102 or may be initiated based on a trigger factor. The trigger factor may be a pre-determined time, a signal received via network 110, or the like. According to an implementation, the report to run may be provided by client 102. For example, client 102 may provide the report to run to local server 105A via network 110. According to another implementation, the report may be stored in metadata accessible to local server 105A. For example, memory 105C may store metadata based on past reports, instructions, or the like. Processor 105B may retrieve the metadata and extract a report to be executed from memory 105C. Initiating the report may include compiling the instructions (e.g., instructions stored in or extracted from the metadata) at processor 105B.

At 210 of FIG. 2A, a runtime generation of the report may be generated based on initiating the report. The runtime generation may be generated at processor 105B. The runtime generation may be program session that optimizes for variables by dynamically generating specialized code to be executed. During runtime generation, variables may last only seconds before the runtime generation is compiled (e.g., using a compiler at processor 105B). The runtime generation of the report may include all the item attributes and corresponding relationships required to run the report. As a simplified example, if a report requires the sales data for one day from a given store, the runtime generation may include a store ID, store name, store location, and sales data.

The techniques provided herein use both viscous attributes and non-viscous attributes. However, it will be understood that if the runtime generation generated at 210 is compiled to retrieve all the item attributes and relationships from the one or more remote databases 115 and 115A, the one or more remote databases would need to receive the item attribute requests via network 110, join the data requested in the report, and transmit the joined data for each item attribute and corresponding values and relationships back to local server 105A via network 110. Accordingly, relative to the techniques disclosed herein, a runtime generation that is compiled with all of the item attributes would take a maximum amount of time and resources.

At 212 of FIG. 2A, a determination that the report calls at least one viscous attribute and at least one non-viscous attribute may be made. The determination may be made by processor 105B. The determination may be made by comparing the item attributes required by the report and identifying that one or more of the item attributes correspond to viscous attributes stored in local cache 105E. Alternatively, or in addition, the determination may be made by comparing the item attributes required by the report and identifying that one or more of the item attributes does not correspond to viscous attributes stored in local cache 105E. According to an implementation, processor 105B may have access to a list of viscous attributes in one or more smart cubes stored at local cache 105E. The list may be generated by processor 105B, may be a component of the smart cube (e.g., a header), or may be provided by client 102.

At 214 of FIG. 2A, the runtime generation at 210 may be modified to remove the one or more viscous attributes. Processor 105B may instruct the removal of the viscous attributes identified at 212 from the item attributes in the runtime generation of the report at 210. Accordingly, at 214, the list of item attributes in the runtime generation of the report may be less than the overall list of item attributes included in the runtime generation of the report at 210. At 214, the remaining item attributes in the runtime generation of the report may be non-viscous attributes and may not be stored in local cache 105E. Accordingly, at 214, the remaining attributes in the runtime generation of the report may be the attributes located at one or more remote databases 115 and 115A. According to an implementation, the runtime generation of 210 may be modified to remove the one or more viscous attributes if corresponding viscous values are included in the smart cube. For example, a determination of whether each viscous attribute has a corresponding viscous value in the smart cube may be made. If it is determined that a given viscous attribute included in the smart cube does not include a corresponding viscous value (e.g., a missing viscous value, a corrupted viscous value, etc.), then that viscous attribute may not be removed from the runtime generation of 210.

At 216 of FIG. 2A, the viscous values for the viscous attributes determined at 212 and removed from the runtime generation at 214 may be retrieved from local cache 105E. Processor 105B may instruct local cache 105E to provide the viscous values corresponding to the viscous attributes. Local cache 105E may provide the viscous values to processor 105B without transmitting the viscous values through network 110. Accordingly, the transmission of the viscous values for the viscous attributes to processor 105B is relatively quicker than a transmission from a remote database to processor 105B.

Processor 105B may receive all of the viscous values for the viscous attributes determined at 212 at one time or may receive them sequentially. A sequential receipt of the viscous values may be based on the order that the viscous values are requested, which may be determined based on the report. According to an implementation, the report may include conditional information such that a second attribute is only requested based on a value of a first or multiple other attributes. Accordingly, processor 105B may receive a first viscous attribute and, subsequently, receive a second attribute from local cache 105E if the second attribute is a viscous attribute or may receive the second attribute from a remote database (e.g., remote databases 115 or 115A) if the second attribute is a non-viscous attribute.

At 218 of FIG. 2A, the runtime generation modified at 214 may be executed. The execution may retrieve the non-viscous attributes determined at 212 from the one or more remote databases 115 and 115A. The one or more remote databases 115 and 115A may receive requests for the non-viscous attributes that may trigger a process to transmit data stored at the one or more remote databases 115 and 115A to local server 105A via network 110. According to an implementation, the one or more remote databases 115 and 115A may provide the data by joining one or more tables that include the non-viscous data. The one or more tables may be joined such that a non-viscous attribute is matched with corresponding non-viscous values. The one or more tables may be provided from the one or more remote databases 115 and 115A, at 218.

At 220, a report result may be generated based on the viscous values of the viscous attributes retrieved at 216 and based on the non-viscous values of the non-viscous attributes retrieved at 218, and may be provided to one or more components connected to network 110. The report results may be determined at processor 105B and may be transmitted to client 102. The report results may also be provided to a machine learning model, as discussed herein, to improve future report generation, viscous and non-viscous attribute determination, or the like.

Figure 2B:
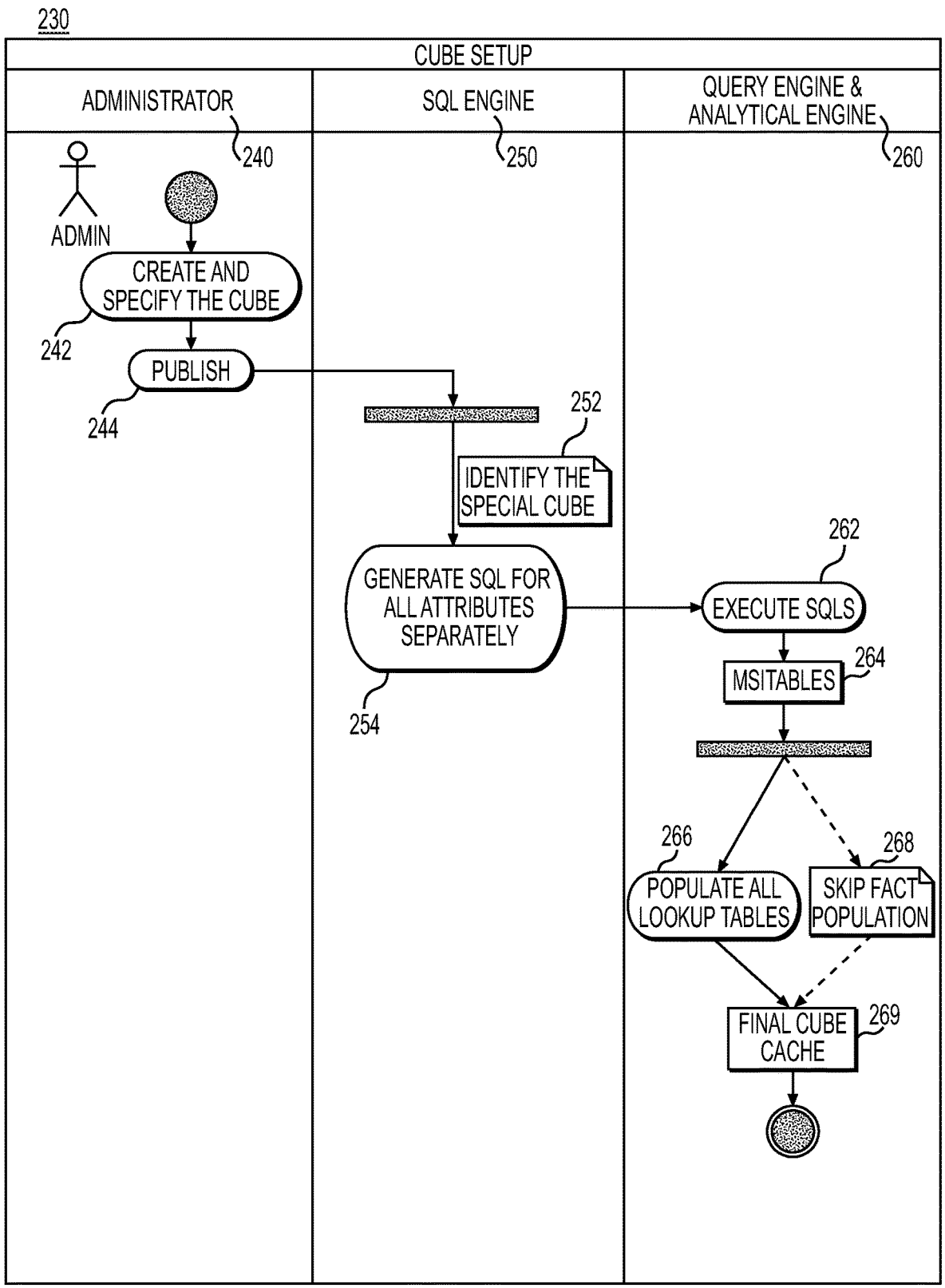
FIG. 2B depicts a data flow for cube setup, according to one or more embodiments.

FIG. 2B depicts an example data flow 230 for a cube setup at a local cache. As shown in FIG. 2B, at an administrator 240, a cube may be created at 242 and may receive specific viscous attributes that are included in the cube. At 244, the cube may be published. At 244 when the cube is published, the cube may not be populated with values (e.g., viscous values) such that it may only include attributes (e.g., viscous attributes). At publishing, the cube may be stored at a local cache such as local cache 105E of FIG. 1. At a structured query language (SQL) engine 250, which may be a part of or may be operated using processor 105B, the cube may be identified at 252. After identifying the cube at 252, an SQL code for all attributes may be generated separately at 254. At a query and analytical engine 260, the SQL code generated at 254 may be executed at 262. Based on executing the SQL code at 262, managed service identity tables (MSITables) may be generated at 264. The MSITables may be populated at 266 with information from one or more databases (e.g., one or more remote databases 115 and 115A) if the corresponding data is available. At 268, fact population for data that is not available may be skipped. At 269 a smart cube may be completed and stored in a local cache, and may include viscous attributes.

Figure 2C:
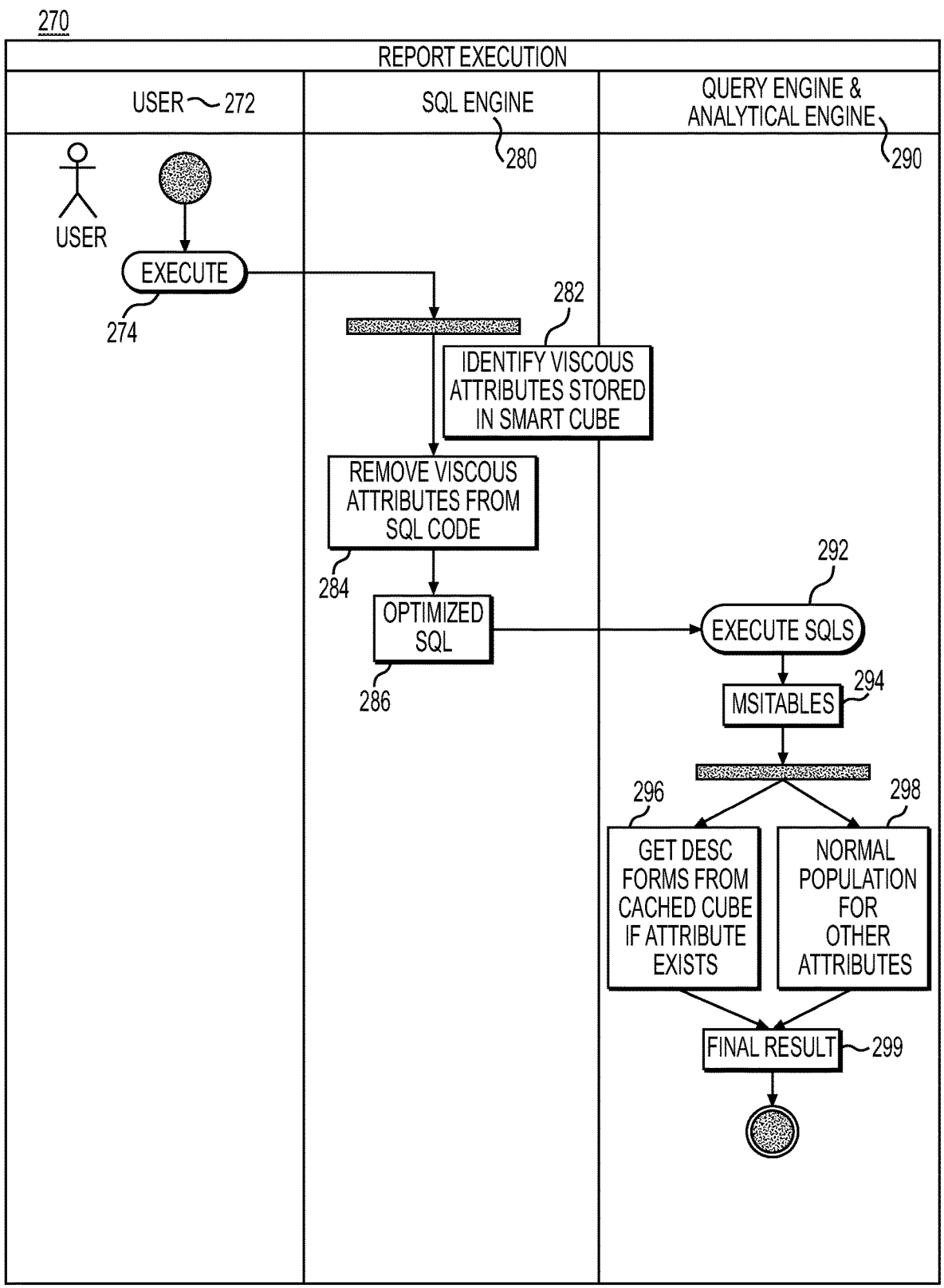
FIG. 2C depicts a data flow for dynamic fetching, according to one or more embodiments.

FIG. 2C depicts a data flow 270 for dynamic fetching of data from the smart cube completed at 269 of FIG. 2B, and stored in local cache. A user 272 may execute an action 274 to request a report. An SQL engine 280, which may be the same as or different from the SQL engine 250, may check whether given item attributes are in the smart cube stored in the local cache at 282. At 284, item attributes provided in the smart cube (e.g., viscous attributes) are removed from a runtime generation of the SQL code to generate an optimized SQL 286. Accordingly, the optimized SQL 286 may include less item attributes as the viscous attributes with values included in the smart cube stored in the local cache may be removed from the optimized SQL code 286.

At a query and analytical engine 290, which may be the same as or different than the query and analytical engine 260, the optimized SQL 286 may be executed at 292 to generate MSITables 294. Based on the MSITables 294, viscous attributes as description (DESC) Forms may be obtained from a smart cube from a local cache at 296 and non-viscous attributes may be obtained over a network from one or more databases at 298. The DESC forms may include any applicable description and related information such as ItemID (e.g., 1, 2, etc.), ItemDesc (e.g., apples, oranges, etc.), customer, day, unit sold, and the like. The query and analytical engine 290 may output final results 299 for a given report based on the viscous and non-viscous attributes.

One or more implementations disclosed herein include a machine learning model. A machine learning model disclosed herein may be trained using the data flow 300 of FIG. 3. As shown in FIG. 3, training data 312 may include one or more of stage inputs 314 and known outcomes 318 related to a machine learning model to be trained. The stage inputs 314 may be from any applicable source including item attributes, viscous attributes, non-viscous attributes, report generation time, etc. (e.g., one or more outputs from a step from flowchart 200 of FIG. 2A, data flow 230 of FIG. 2B, data flow 270 of FIG. 2C, flowchart 400 of FIG. 4, and/or flowchart 500 of FIG. 5). The known outcomes 318 may be included for machine learning models generated based on supervised or semi-supervised training. An unsupervised machine learning model may not be trained using known outcomes 318. Known outcomes 318 may include known or desired outputs for future inputs similar to or in the same category as stage inputs 314 that do not have corresponding known outputs.

The training data 312 and a training algorithm 320 may be provided to a training component 330 that may apply the training data 312 to the training algorithm 320 to generate a machine learning model. According to an implementation, the training component 330 may be provided comparison results 316 that compare a previous output of the corresponding machine learning model to apply the previous result to re-train the machine learning model. The comparison results 316 may be used by the training component 330 to update the corresponding machine learning model. The training algorithm 320 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

Figure 4:
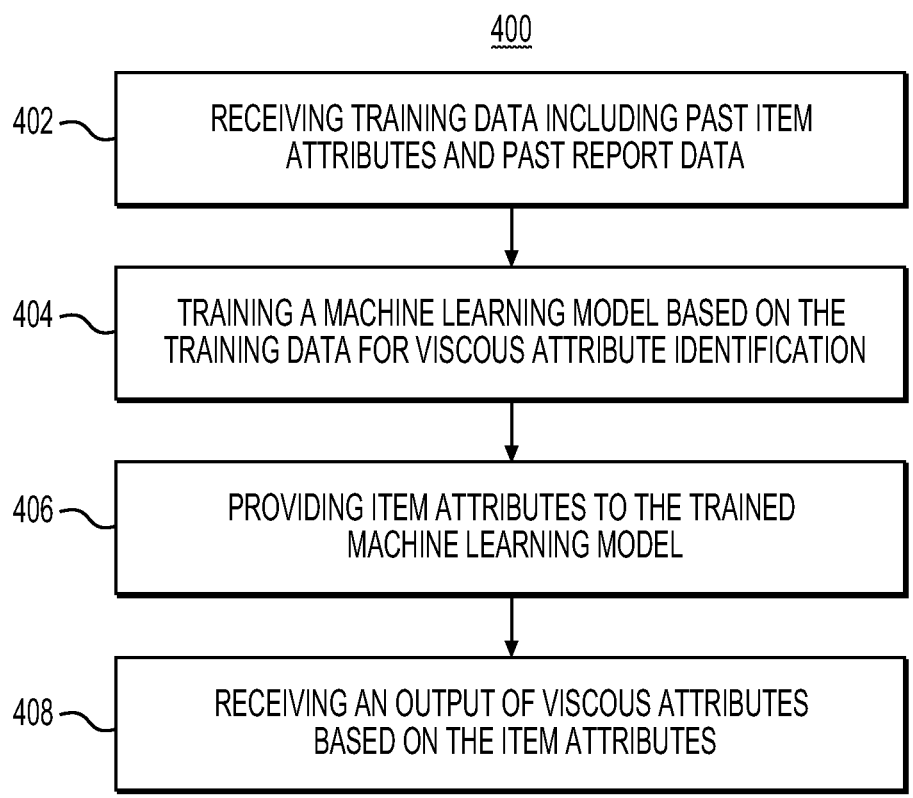
FIG. 4 depicts a flowchart for using a machine learning model to output viscous attributes, according to one or more embodiments.

According to implementations of the disclosed subject matter, a machine learning model may be used to output viscous attributes based on item attributes. FIG. 4 shows a flowchart 400 for outputting viscous attributes. At 402 of FIG. 4, training data including past item attributes and past report data may be received. The past item attributes may be attributes used to execute past reports. The past report data may be data associated with the report results, report execution time, the item attributes that changed over multiple reports, a degree of change in values, or the like. The training data may be the same as or similar to training data 312 of FIG. 3.

At 404, a machine learning model may be trained based on the training data. The machine learning model may be trained to identify viscous attributes. An instance of the machine learning data may be trained for a given organization such that a different model or different version of a model may be trained for each different organization. The machine learning model trained at 404 may be trained based on the techniques disclosed at FIG. 3. The machine learning model may be trained to update weights based on the training data received at 402. One or more machine learning algorithms may be used to train the machine learning model to identify viscous attributes. For example, the machine learning model may be trained to identify item attributes that do not change or to identify a viscosity duration of one or more item attributes. The machine learning model may identify relationships between different item attributes and, for example, identify attributes that may be related to each other and/or attributes that are not related to other attributes. The machine learning model may determine which attributes have not changed materially over an applicable number of past reports. One or more weights for one or more layers of the machine learning model may be modified based on one or more of the determinations disclosed above.

At 406, item attributes for a given organization and/or from one or more remote databases may be provided to the machine learning model trained at 404. The item attributes may be attributes that are the same as or similar to the attributes received at 402. At 408, the machine learning model may output viscous attributes based on the item attributes received at 406. The viscous attributes may be output by the machine learning model based on its training at 404. In other words, the trained machine learning model may be configured to identify viscous attributes among the item attributes received at 406. The viscous attributes may correspond to attributes that do not change materially overtime. Alternatively, or in addition, the machine learning model may also output viscosity durations in addition to the viscous attributes. The viscosity durations may be used to determine update rates for each viscous attribute such that different viscous attributes stored in a local cache may be updated at different frequencies, as described in FIG. 5.

Figure 5:
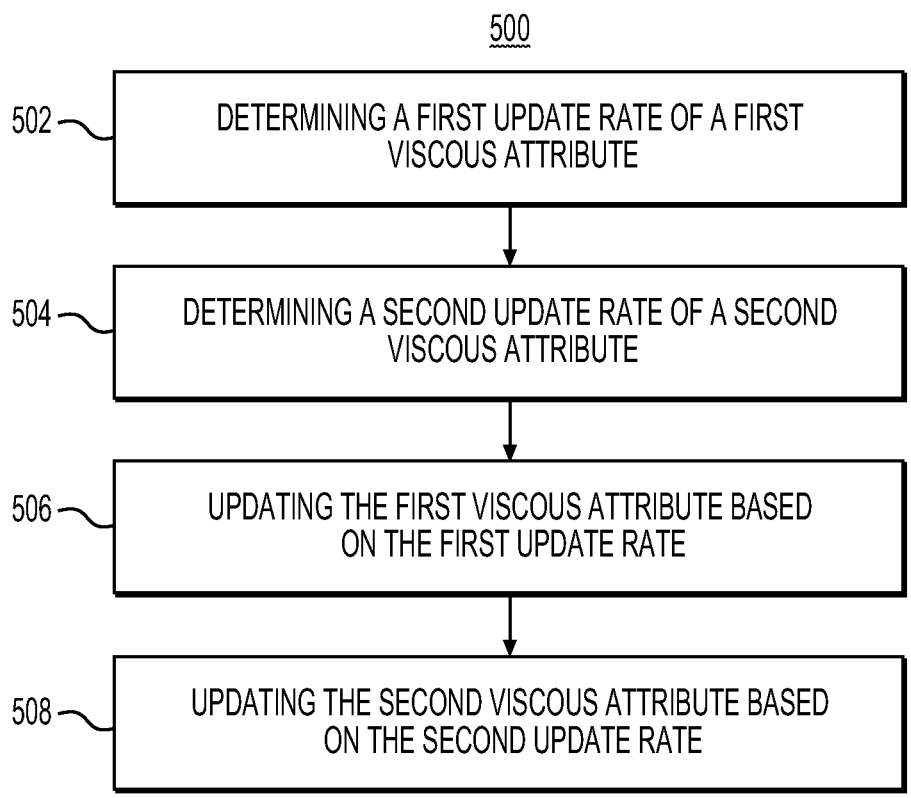
FIG. 5 depicts a flowchart for updating viscous attributes in a cache, according to one or more embodiments.

FIG. 5 depicts a flowchart 500 for updating viscous attributes in a cache. At 502 a first update rate of a first viscous attribute may be determined. The first update rate may pre-determined or dynamically determined and may be based on the amount of time the values corresponding to the first viscous attribute materially change for a given organization. As an example, the first viscous attribute may be the inventory of a yellow widget and the first update rate may be 1 week based on the inventory of the yellow widget changing materially on a weekly basis. The first update rate may be output by a machine learning model, such as the machine learning model described in flowchart 400 of FIG. 4.

At 504, a second update rate of a second viscous attribute may be determined. The second update rate may pre-determined or dynamically determined and may be based on the amount of time the values corresponding to the second viscous attribute materially change for a given organization. As an example, the second viscous attribute may be the cost of the yellow widget and the second update rate may be 1 month based on the cost of the material that is used to produce the yellow widget changing materially on a monthly basis. The second update rate may be output by a machine learning model, such as the machine learning model described in flowchart 400 of FIG. 4. At 506, the first viscous attribute may be updated based on the first update rate and at 508 the second viscous attribute may be updated based on the second update rate. According to an implementation, the first update rate and/or the second update rate may change based on additional data (e.g., additional data provided to a machine learning model at a subsequent time).

According to an implementation of the disclosed subject matter, a first remote database 115 may provide a smart cube with a subset of requested viscous values for viscous attributes and a second remote database 115A may provide an updated smart cube with a different or overlapping subset of requested viscus values for viscous attributes. A given remote database may be selected based on the data (e.g., viscous values) available to the given remote database.

Figure 6A:
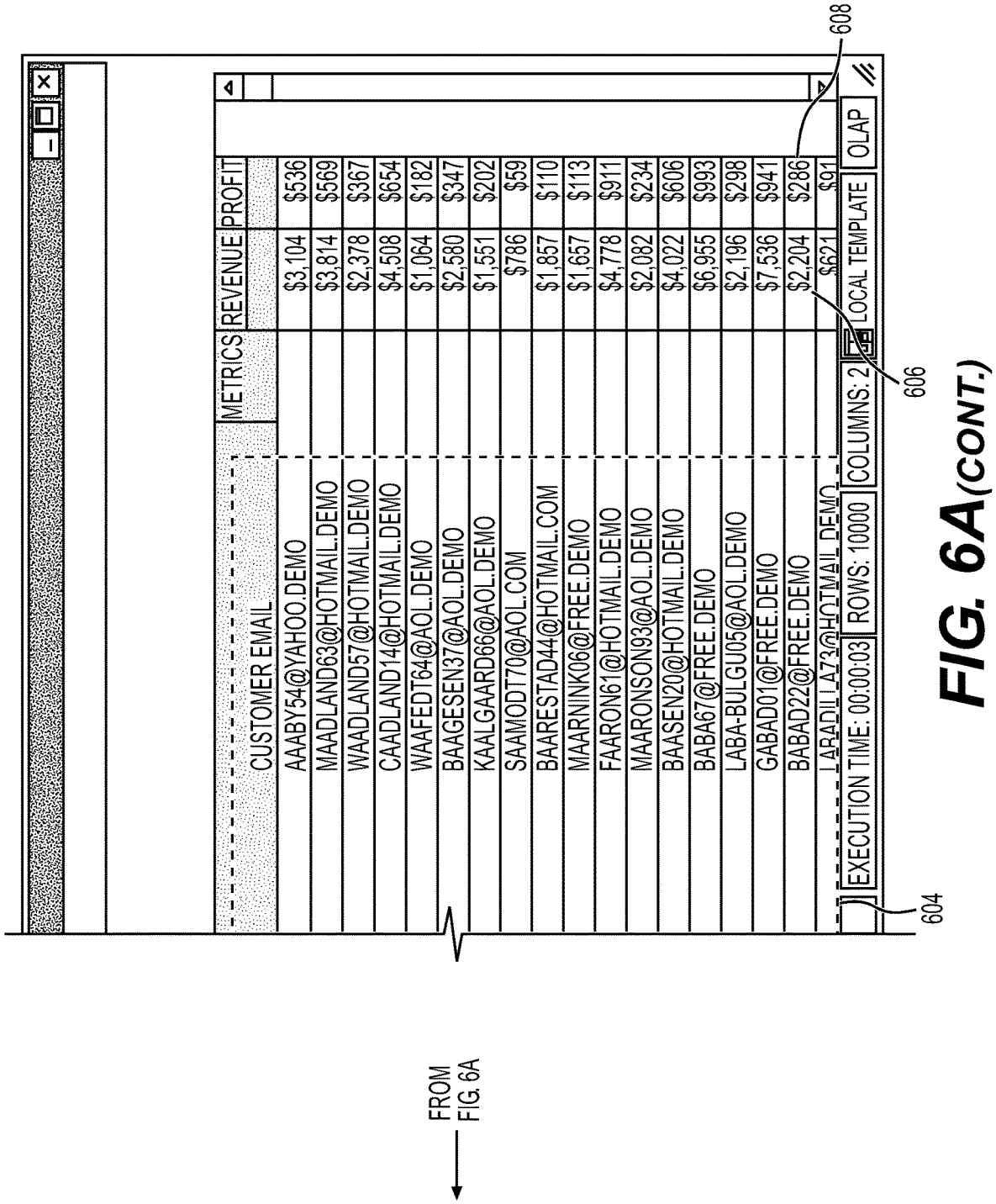
FIG. 6A depicts example item attributes, according to one or more embodiments.

FIG. 6A depicts example item attributes 600 for a given organization. The item attributes 600 may include a customer ID 602 for each customer. The item attributes 600 may include a set of viscous attributes 604 that are identified as not materially changing over a given period of time. As shown, these viscous attributes 604 include customer last names, customer first names, customer addresses, and customer email addresses. The item attributes 600 also include the revenue 606 from each customer and profit 608 from each customer.

FIG. 6B depicts an example code comparison for dynamic fetching. Code 620 shows a runtime generation of a report, as discussed at 210 of FIG. 2A. As shown, the runtime generation of a report includes a number of item attributes 622 including a Day, Category, Customer, Item, Month, Quarter, Subcategory, and Order detail. According to this example, the runtime generation shown in code 620 is run and a total of 23 columns are returned from one or more databases, as indicated at 624. In comparison, code 630 of FIG. 6B is executed in accordance with the techniques disclosed herein. As shown in code 630, a runtime generation of a report is modified to remove viscous attributes stored in local cache. Accordingly, the code corresponding to item attributes 622 is indicated by non-viscous attributes 632. As shown, the item attributes (i.e., viscous attributes) Category, Month, and Quarter are all removed from the runtime generation prior to execution. By removing the viscous attributes and retrieving them from a local cache, only 12 columns are returned from one or more databases, as indicated at 634. Accordingly, less data is joined and transmitted by implementing the code 630 in accordance with the techniques disclosed herein.

While techniques discussed herein discuss steps performed by a local server 105A, client 102 and/or steps performed by one or more remote databases 115 and 115A, some of the steps may be performed on a single device, such as one or more remote databases 115 and 115A or local server 105A. Alternatively, these steps may be practiced on more devices than local server 105A and remote databases 115 and 115A. For example, there may be more than one local server 105A and/or more than two remote databases 115 and 115A.

In general, any process or operation discussed in this disclosure that is understood to be computer-implementable, such as the process illustrated in FIGS. 2, 3, 4, and 5, may be performed by one or more processors of a computer system, such any of the systems or devices in the computing system of FIG. 1 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Figure 7:
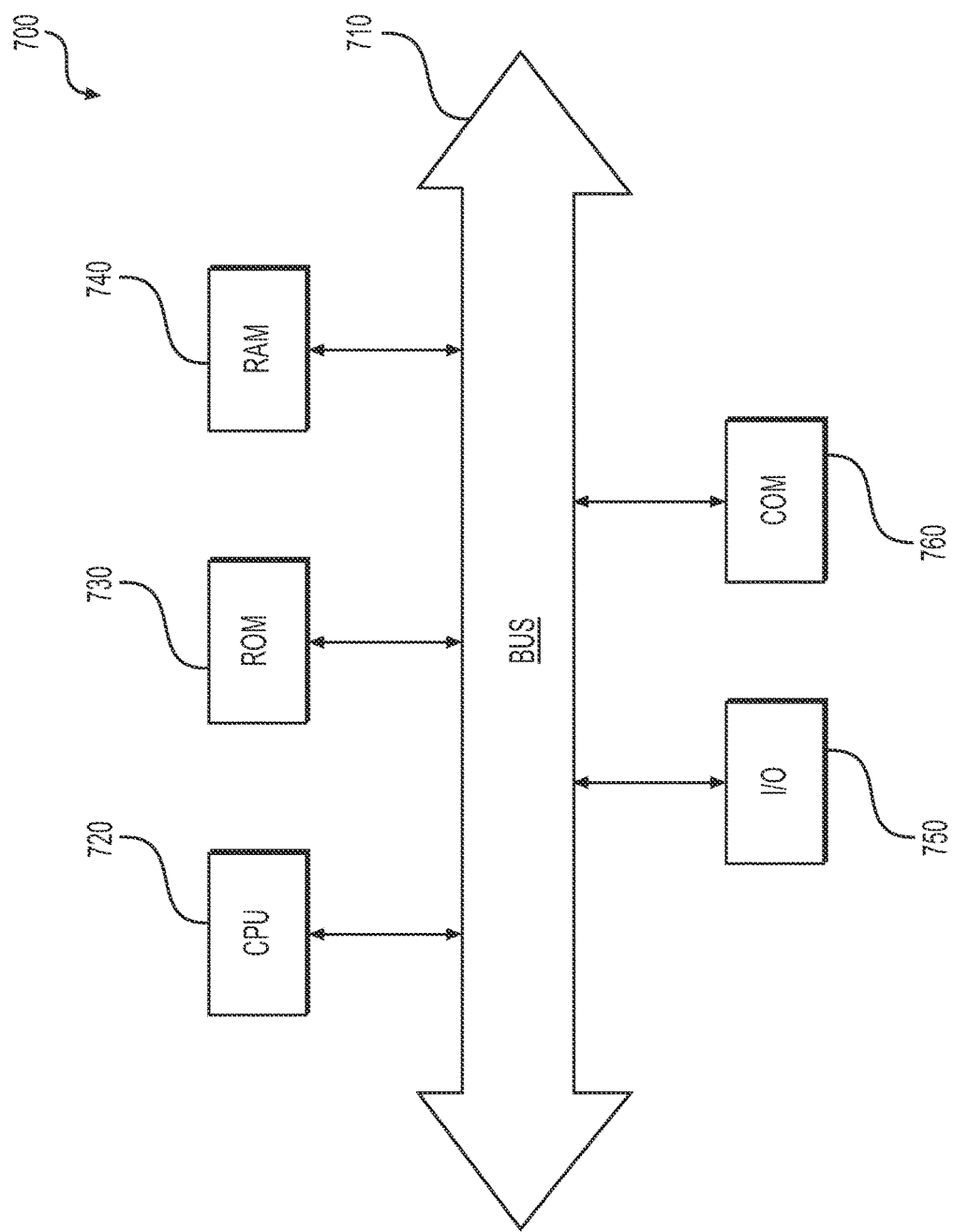
FIG. 7 depicts an example system that may execute techniques presented herein.

FIG. 7 depicts an example system 700 that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit ("CPU") 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for decreasing report result times, the method comprising:
    receiving a trained machine learning model trained using training data including, item attributes, attributes having a frequency of change for a respective attribute value below a threshold frequency, and attributes having the frequency of change for the respective attribute value not below the threshold frequency, in which the attributes having the frequency of change for the respective attribute value below the threshold frequency are identified;
    applying the trained machine learning model to automatically identify, among a plurality of item attributes associated with an organization, an attribute having the frequency of change for a respective attribute value below the threshold frequency;
    receiving, at a first time, a first smart cube comprising a value for the attribute having the frequency of change for the respective attribute value below the threshold frequency;
    storing the first smart cube at a local cache;
    initiating a report associated with the organization;
    generating a database query for the report based on initiating the report;
    determining that the report requires the attribute having the frequency of change for the respective attribute value below the threshold frequency and requires another attribute among the plurality of item attributes other than the attribute having the frequency of change for the respective attribute value below the threshold frequency;
    modifying the database query to remove the attribute having the frequency of change for the respective attribute value below the threshold frequency from the database query;
    retrieving a value for the attribute having the frequency of change for the respective attribute value below the threshold frequency from the first smart cube at the local cache;
    executing the modified database query to retrieve a value for the other attribute from a remote database; and
    providing a report result.

2. The method of claim 1, further comprising receiving, at a second time, an updated first smart cube comprising an updated value for the attribute having the frequency of change for the respective attribute value below the threshold frequency.

3. The method of claim 2, wherein the second time is one of a pre-determined time or a dynamically determined time.

4. The method of claim 3, wherein the dynamically determined time is based on the frequency of change for the attribute having the frequency of change for the respective attribute value below the threshold frequency.

5. The method of claim 1, further comprising receiving, at a second time, a second smart cube comprising a value for a second attribute having a frequency of change for a respective attribute value below the threshold frequency.

6. The method of claim 1, further comprising:
    receiving the plurality of item attributes;
    receiving past report data associated with the organization; and
    providing the plurality of item attributes and the past report data to a machine learning model trained to identify attributes having a frequency of change for respective attribute values below the threshold frequency, wherein automatically identifying the attributes having the frequency of change for the respective attribute values below the threshold frequency comprises receiving an output from the machine learning model.

7. The method of claim 1, wherein the first smart cube is one of a lookup cube or a relationship cube.

8. The method of claim 1, wherein the other attribute is retrieved from the remote database after the remote database joins the other attribute in a table.

9. The method of claim 1, wherein the report is extracted from metadata.

10. The method of claim 1, wherein modifying the database query comprises removing the attribute having the frequency of change for the respective attribute value below the threshold frequency from the database query that have a value in the first smart cube.

11. A system for decreasing report result times, the system comprising:
    at least one memory storing instructions; and
    at least one processor executing the instructions to perform operations, the operations comprising:
        receiving a trained machine learning model trained using training data including, item attributes, attributes having a frequency of change for a respective attribute value below a threshold frequency, and attributes having the frequency of change for the respective attribute value not below the threshold frequency, in which the attributes having the frequency of change for the respective attribute value below the threshold frequency are identified;
        applying the trained machine learning model to automatically identify, among a plurality of item attributes associated with an organization, an attribute having the frequency of change for a respective attribute value below the threshold frequency;

receiving, at a first time, a first smart cube comprising a value for the attribute having the frequency of change for the respective attribute value below the threshold frequency;

storing the first smart cube at a local cache;

initiating a report associated with the organization;

generating a database query for the report based on initiating the report;

determining that the report requires the attribute having the frequency of change for the respective attribute value below the threshold frequency and requires another attribute among the plurality of item attributes other than the attribute having the frequency of change for the respective attribute value below the threshold frequency;

modifying the database query to remove the attribute having the frequency of change for the respective attribute value below the threshold frequency from the database query;

retrieving a value for the attribute having the frequency of change for the respective attribute value below the threshold frequency from the first smart cube at the local cache;

executing the modified database query to retrieve a value for the other attribute from a remote database; and providing a report result.

12. The system of claim 11, wherein the operations further comprise receiving, at a second time, an updated first smart cube comprising an updated value for the attribute having the frequency of change for the respective attribute value below the threshold frequency.

13. The system of claim 12, wherein the second time is one of a pre-determined time or a dynamically determined time.

14. The system of claim 13, wherein the dynamically determined time is based on the frequency of change for the attribute having the frequency of change for the respective attribute value below the threshold frequency.

15. The system of claim 11, wherein the operations further comprise receiving, at a second time, a second smart cube comprising a value for a second attribute having a frequency of change for a respective attribute value below the threshold frequency.

16. The system of claim 11, wherein the operations further comprise:
receiving the plurality of item attributes;
receiving past report data associated with the organization; and
providing the plurality of item attributes and the past report data to a machine learning model trained to identify attributes having a frequency of change for respective attribute values below the threshold frequency, wherein automatically identifying the attributes having the frequency of change for the respective attribute values below the threshold frequency comprises receiving an output from the machine learning model.

17. A non-transitory computer-readable medium storing instructions that, when executed by a processor, cause the processor to perform operations, the operations comprising:
receiving a trained machine learning model trained using training data including, item attributes, attributes having a frequency of change for a respective attribute value below a threshold frequency, and attributes having the frequency of change for the respective attribute value not below the threshold frequency, in which the attributes having the frequency of change for the respective attribute value below the threshold frequency are identified;

applying the trained machine learning model to automatically identify, among a plurality of item attributes associated with an organization, an attribute having the frequency of change for a respective attribute value below the threshold frequency;

receiving, at a first time, a first smart cube comprising a value for the attribute having the frequency of change for the respective attribute value below the threshold frequency;

storing the first smart cube at a local cache;

initiating a report associated with the organization;

generating a database query for the report based on initiating the report;

determining that the report requires the attribute having the frequency of change for the respective attribute value below the threshold frequency and requires another attribute among the plurality of item attributes other than the attribute having the frequency of change for the respective attribute value below the threshold frequency;

modifying the database query to remove the attribute having the frequency of change for the respective attribute value below the threshold frequency from the database query;

retrieving a value for the attribute having the frequency of change for the respective attribute value below the threshold frequency from the first smart cube at the local cache;

executing the modified database query to retrieve a value for the other attribute from a remote database; and providing a report result.

18. The non-transitory computer-readable medium of claim 17, wherein the operations further comprise receiving, at a second time, an updated first smart cube comprising an updated value for the attribute having the frequency of change for the respective attribute value below the threshold frequency.

19. The non-transitory computer-readable medium of claim 18, wherein the second time is one of a pre-determined time or a dynamically determined time.

20. The non-transitory computer-readable medium of claim 19, wherein the dynamically determined time is based on the frequency of change for the attribute having the frequency of change for the respective attribute value below the threshold frequency.

* * * * *